Jan. 10, 1939.   G. E. HABEL   2,143,314
SLIP COVER FOR AUTOMOBILE SEAT CUSHIONS
Filed July 28, 1938
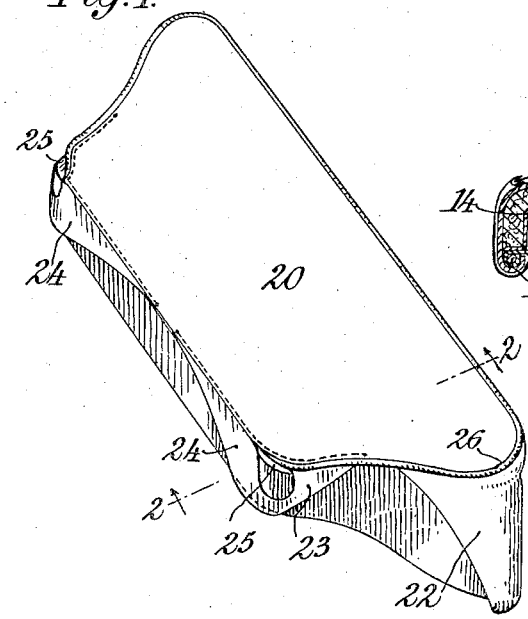
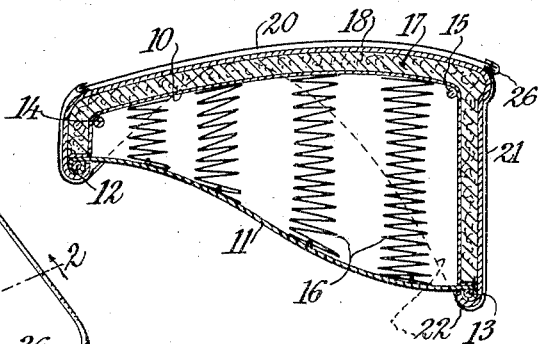
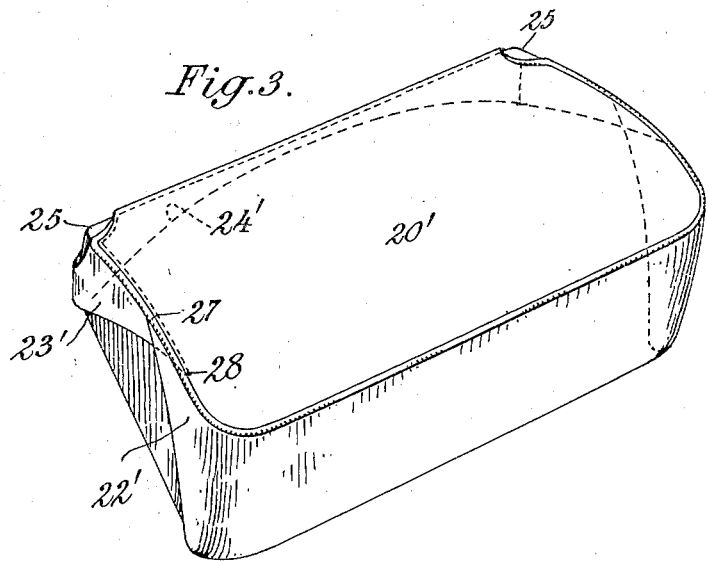
INVENTOR
Grant E. Habel,
BY
A. Engel
ATTORNEY Patented Jan. 10, 1939

2,143,314

UNITED STATES PATENT OFFICE 2,143,314

SLIP COVER FOR AUTOMOBILE SEAT CUSHIONS

Grant E. Habel, Bronx, N. Y., assignor to Grenadier Products Inc., Bronx, N. Y., a corporation of New York Application July 28, 1938, Serial No. 221,656

6 Claims. (Cl. 155—182)

My present invention relates to slip covers for automobile seat members and the like and aims to provide certain improvements therein.

Automobile seat members, namely the seat cushions and the back cushions, are usually formed with a substantially rigid steel frame for supporting the cushioning springs and part of this frame extends around the top of the seat member below the padding thereof for holding the cushion in shape. When one sits upon the seat cushion or rests against the back cushion the springs thereof are compressed and the cushion is somewhat flattened out so as to enlarge its top surface. Where the conventional types of slip covers are applied to such cushions they must be securely tied or tacked down, and even when they are so fastened there is a great tendency when the cushions are compressed in use for the covers to wrinkle and to bunch-up at the corners, especially at the rear corners of the seat cushions. Frequently also the rear corners give way because of the strain placed upon them.

The object of my invention is to provide a slip cover for automobile seat and rear cushions which will overcome the tendency to wrinkling and breaking down at the corners. A further object is to provide such slip cover which will at all times present a neat and trim appearance and which when compressed in use will tend to make the cover fit more snugly. A further object is to provide a slip cover for the purpose described which will require less material than the conventional slip covers. A further object is to provide a slip cover with pockets or openings at certain corners thereof to allow the cushioning material to extend more tightly therethrough when the cushion is compressed in use. A further object is to provide a slip cover with triangular shaped rear and side pieces, which will in view of their connection to the top portion and the manner of mounting the cover on the cushion, operate to transmit a pull upon the central portion of the edges of the top portion to insure a smooth and trim appearance for the cover. The invention will be better understood from the detailed description which follows when considered in conjunction with the accompanying drawing wherein I have shown two embodiments of my invention applied to seat cushions, and wherein:

Figure 1 is a perspective view of an automobile seat cushion with my invention applied thereto.

Fig. 2 is a section taken substantially along the plane of the line 2—2 of Fig. 1.

Fig. 3 is a perspective view of an automobile seat cushion disclosing a modification of my invention applied thereto.

Referring first to Figs. 1 and 2 of the drawing, the automobile seat may be said to consist of a skeleton frame provided by a plurality of metal bands 10 and 11, and metallic rods 12, 13, 14 and 15 and suitable cross bands (not shown) between which cushioning springs 16 are supported. The seat skeleton frame is covered with a padding 17 which extends completely over the top and side surfaces and this padding is covered as is usual with an upholstery fabric 18. The seat in top plan or horizontal cross section is of substantially trapezoidal form with rounded corners.

To protect the upholstery fabric and enhance the appearance of the seat cushion, I provide a slip cover which consists of a top portion 20 having substantially the form and size of the top of the cushion and having front, rear and side portions depending from the top portion. The front portion 21 is of a size to cover the front of the seat and is formed at its bottom edge at the ends thereof with turned back portions to provide a re-entrant flange 22 for engagement over the lower frame element 13 of the seat. The side portions each preferably consists of two substantially triangular portions 22 and 23 which for the purpose of economy are formed integrally with the front portion and rear portion respectively. Each of the triangular portions 22 and 23 have the sides thereof which are connected to the top portion of a length to extend from substantially the middle of the side of the top portion to the front and rear edges thereof, thus leaving the third side of each of the triangular pieces unconnected and extending from said approximate middle point to the front and rear portions respectively. The rear portion is also preferably formed of two substantially triangular portions 24 which have their top edges connected to the rear edge of the top portion and of a length to extend from substantially the middle of said edge to the sides of the triangular side pieces 23 to which they are connected or with which they are integrally formed. Preferably at the rear corners at the juncture of the portions 23 and 24, an opening or pocket is provided into which the rear corners 25 of the cushion may extend and thereby provide a rear anchorage for the slip cover. To further enhance the appearance of the slip cover, the seamed connected edges thereof may be covered with a tape 26 of a contrasting color to that of the slip cover proper.

In Fig. 3 the slip cover construction disclosed is substantially the same as that described with respect to Figs. 1 and 2 and primarily differs therefrom in that the portions 22' and 23' at their line of union with the top portion 20' cross each other and extend respectively beyond the middle point of the sides to which they are connected as indicated at 27 and 28. Obviously, if desired the side portions 22' and 23' may be integrally formed as is the rear portion 24'.

In applying my invention to a seat cushion, the pockets or openings at the rear corners provided by the triangular portions 23 and 24 are first engaged around the rear corners 25 and anchored below the frame member 12, the cover is then drawn over the top of the cushion to somewhat compress it and the lower edge of the front portion 21 is then engaged around the frame member 13 or otherwise secured to the seat frame adjacent the bottom thereof. When the seat cushion is sat upon or pressure otherwise applied thereto, the pressure will somewhat enlarge the cushion whereupon the corners 25 will be forced further through the openings and the strain thus placed upon the side portions and rear portions because of their triangular formation will function to draw the top portion snugly over the cushion to maintain the cover in a neat and wrinkleless condition. It will also be evident that the triangular formation of the rear and side portions result in a substantial saving in the material required for the slip cover.

The invention it will be appreciated is applicable in substantially the same manner to the rear cushions of automobile seats, and while it may be necessary to slightly modify the specific form of the slip covers to fit them to such different shaped cushions, it is to be understood that the changes necessary to accomplish this can be readily made within the range of mechanical skill and without departing from the spirit of my invention. Also in the accompanying claims, when I refer to a seat member cushion, it is to be understood that either a seat cushion or a back cushion is implied.

What I claim is:

1. A slip cover for an automobile seat member cushion and the like consisting of a top portion of a size to extend over the top of the cushion, a front, a rear and side portions extending downwardly from the top portion and adapted to engage over the respective parts of the cushion, the side portions each comprising two substantially triangular sections each having one side thereof approximately one-half the length of the side of the top portion and connected thereto from approximately the middle of the side of the top portion to the front and rear edges respectively, and another side of each of the triangular sections being connected to the front and rear portions respectively.

2. A slip cover for an automobile seat cushion mounted on a seat which has a rigid frame around the bottom edge thereof, said cover consisting of a top portion having substantially the form and size of the top of the cushion, a front, a rear and side portions extending downwardly from the top portion and adapted to engage over said respective parts of the seat, the lower edge of the front portion being adapted to be secured to the lower edge of the seat, a part of the side portions being of substantially triangular form with two sides of the triangle joined respectively to the rear portion and to the top portion, and the side of the triangular portion which is connected to the top portion being of a length to extend substantially to the middle of the side of the top portion.

3. A slip cover for an automobile seat cushion mounted on a seat which has a rigid frame around the bottom edge thereof, said cover consisting of a top portion having substantially the form and size of the top of the cushion, a front, a rear and side portions extending downwardly from the top portion and adapted to engage over said respective parts of the seat, the lower edge of the front portion being formed at its ends with a turned-back or re-entrant flange for engaging under the front corners at the bottom edge of the frame, a part of the side portions being of substantially triangular form with two sides of the triangle being joined respectively to the front portion and to the top portion, and the side of the triangular portion which is connected to the top portion being of a length to extend substantially to the middle of the side of the top portion.

4. A slip cover for an automobile seat cushion mounted on a seat which has a rigid frame around the bottom edge thereof, said cover consisting of a top portion having substantially the form and size of the top of the cushion, a front, a rear and side portions extending downwardly from the top portion and adapted to engage over said respective parts of the seat, the lower edge of the front portion being adapted to be secured to the lower edge of the seat, a part of the side portions and a part of the rear portions being of substantially triangular form with two sides of the triangular portions at the side and at the rear being joined respectively to each other and to the top portion, and the sides of the triangular portions which are connected to the top portion being of a length to extend substantially to the middle of the sides of the top portion to which they are connected.

5. A slip cover for an automobile seat member cushion and the like consisting of a top portion having substantially the form and size of the top of the cushion, a front, a rear and side portions extending downwardly from the top portion and adapted to engage over the respective parts of the cushion, pockets or openings at the juncture of the side and rear portions with the top portion at the rear corners of the cover for receiving the rear corners of the cushion and into which pockets the corners of the cushion may be forced to draw the top portion snugly over the top of the cushion and means for securing the free edge of the front portion to the bottom edge of said portion of the seat.

6. A slip cover for an automobile seat cushion and the like mounted on a seat which has a rigid frame around the bottom edges thereof, said cover consisting of a top portion having substantially the form and size of the top of the cushion, a front, a rear and side portions extending downwardly from the top portion and adapted to engage over said respective parts of the seat, the corners at the lower edges of the juncture of the rear and side portions being adapted to engage under the rear corners at the bottom edge of the frame, a part of the side portions being of substantially triangular form with two sides of the triangles joined respectively to the rear portion and to the top portion, and the side of the triangular portion which is connected to the top portion being of a length to extend substantially to the middle of the side of the top portion, and another part of the side portions at the juncture thereof with the rear portion and with the top portion provided with pockets at the rear corners of the cover for receiving said corners of the cushion and into which pockets the rear corners of the cushion may be forced, and the lower edge of the front portion of the cover being adapted to be secured to the lower edge of the seat to draw the top portion snugly over the top of the cushion.

GRANT E. HABEL.